United States Patent [19]

Tessner

[11] 4,067,312

[45] Jan. 10, 1978

[54] AUTOMATIC FEEDBACK CONTROL FOR WIRE SAW

[75] Inventor: Roy Lynnard Tessner, Atlanta, Ga.

[73] Assignee: Elberton Granite Association, Inc., Elberton, Ga.

[21] Appl. No.: 721,395

[22] Filed: Sept. 8, 1976

[51] Int. Cl.² .................................................. B28D 1/08
[52] U.S. Cl. ...................................................... 125/21
[58] Field of Search ...................... 51/165.92, 165 R; 125/21, 12

[56] References Cited

U.S. PATENT DOCUMENTS

| 2,674,283 | 4/1954 | Dessureau | 125/21 |
| 3,090,171 | 5/1963 | Stimson | 51/165.92 |

FOREIGN PATENT DOCUMENTS 1,291,784  3/1962  France ..................................... 125/21

Primary Examiner—Harold D. Whitehead
Attorney, Agent, or Firm—Newton, Hopkins & Ormsby

[57] ABSTRACT

To maintain a constant cutting pressure in the cutting wire of a stone cutting wire saw for efficient sawing, the sensor of a radio frequency inductive proximity switch is mounted near the bowed section of the sawing wire to monitor its degree of bow. When the bow of the wire is reduced after cutting down into the stone, modification of the sensor signal activates an output circuit of the proximity switch control module which turns on a wire down feed means to quickly reestablish the proper degree of bow and wire cutting pressure. The activation distance is so small that, for practical purposes, constant wire cutting pressure is maintained.

7 Claims, 6 Drawing Figures

AUTOMATIC FEEDBACK CONTROL FOR WIRE SAW

BACKGROUND OF THE INVENTION

Heretofore, in the art of stone cutting with a wire saw, the cutting wire has been intermittently fed down against the stone either by a clock feed, a mechanical ratchet feed, or an electronic variable speed down feed motor. The disadvantage of all of these prior art methods is that none of them could be optimized for the conditions that existed in each stone cutting, wire, and no direct feedback from the wire was possible. As a result, in the prior art, the stone cutting or sawing operation was frequently carried out in a slow, inefficient and uneconomical manner, without the proper degree of bow and cutting pressure being constantly maintained on the wire of the saw mechanism.

The sole purpose of this invention is to completely cure the above deficiency of the prior art by providing an automatic feedback control for the down feed of the cutting or sawing wire. An almost exactly constant cutting pressure is thus maintained on the wire at all times as well as the proper degree of bow in the wire to assure cutting of the stone with maximum efficiency and economy.

The automatic feedback control of the invention constantly measures the bow in the cutting wire and adjusts the downfeed accordingly. No other prior art devices can accomplish this. While the "bow" may be measured or sensed mechanically, optically or by pneumatic means, electronic sensing means is the least subject to wear and malfunction and therefore is employed in the invention.

SUMMARY OF THE INVENTION

In accomplishing the above-stated objectives, the sensor of an rf inductive proximity switch is adjustably mounted on the wire down feed carriage close to the bowed cutting section of the wire to constantly sense and monitor the degree of bow. When the bowed wire approaches flatness after cutting into the stone, the sensor instantly activates an output circuit of the proximity switch control module and thereby turns on the carriage down feed means to quickly reestablish the proper degree of wire bow and cutting pressure. The activation distance is so small that, for practical purposes, constant wire cutting pressure is maintained.

In one preferred mode of operation called the "chase" or catch-up mode, the wire is below or leads the sensor of the proximity switch mounted on the carriage, and the sensor chases the wire after activation of a down feed means. In an alternate "run away" mode, the wire is positioned manually above the sensor. When the wire cuts down to the sensor, the sensor turns on the down feed means, and in effect runs away from the wire. This run away mode appears to be favorable for multiple strand saws. Either mode of operation is reliable, simplified and consistent and also relatively economical to manufacture and install.

DETAILED DESCRIPTION

Figure 1A:
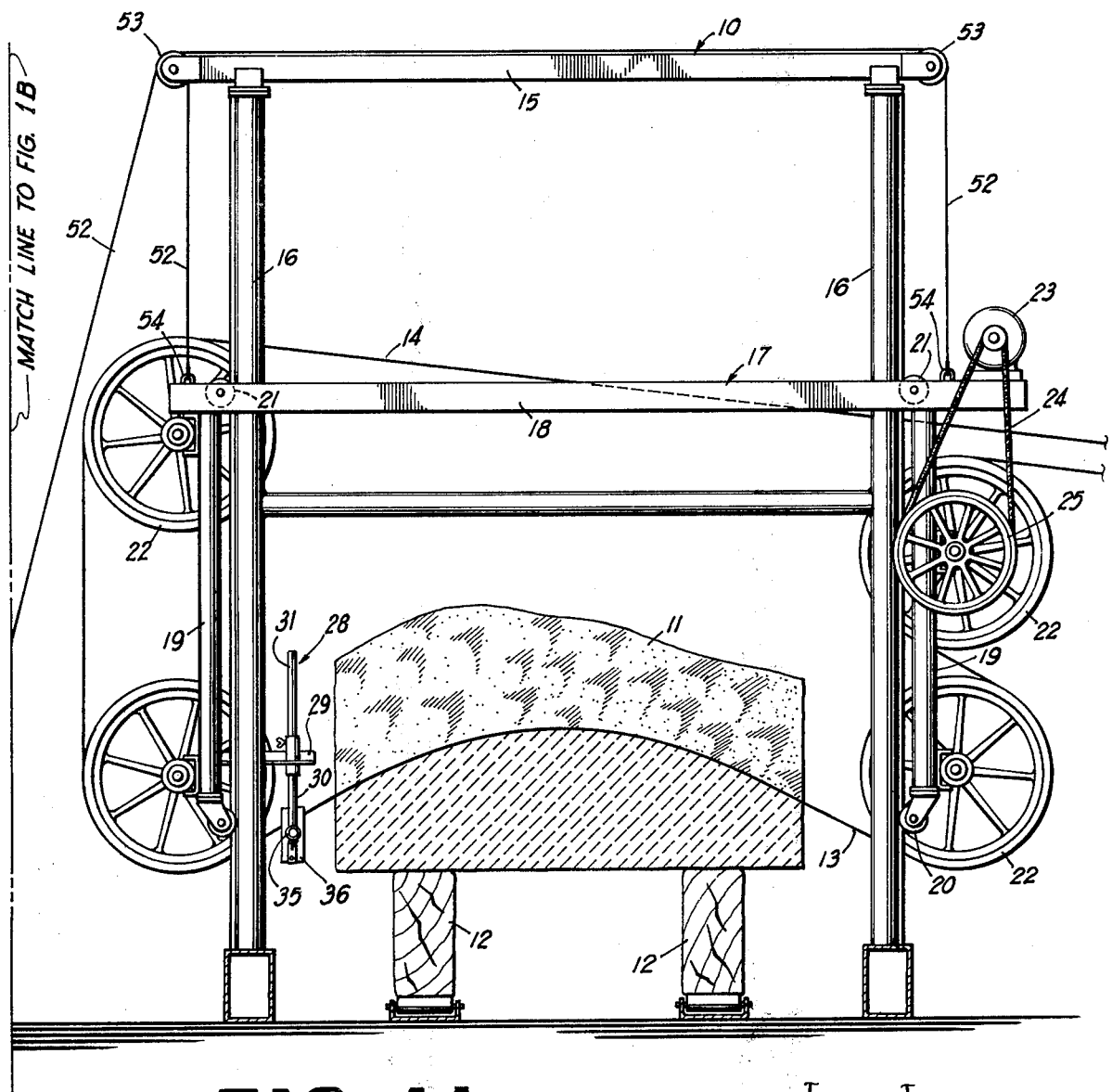
FIG. 1A is a partly schematic side elevational view of a wire saw equipped with the feedback control means of the invention.
Figure 1B:
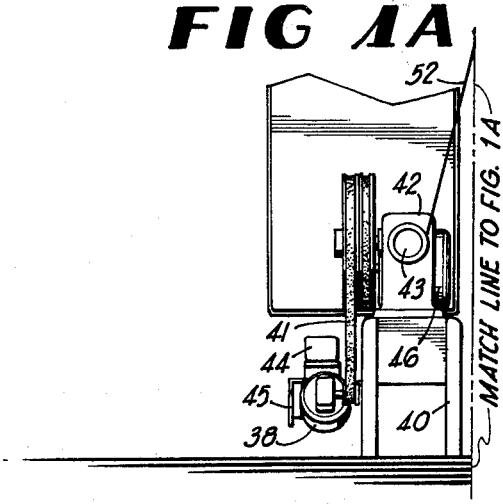
FIG. 1B is a fragmentary elevational view of a cutting wire dolly or carriage feed down means associated with the wire saw and mounted near one side thereof.
Figure 2:
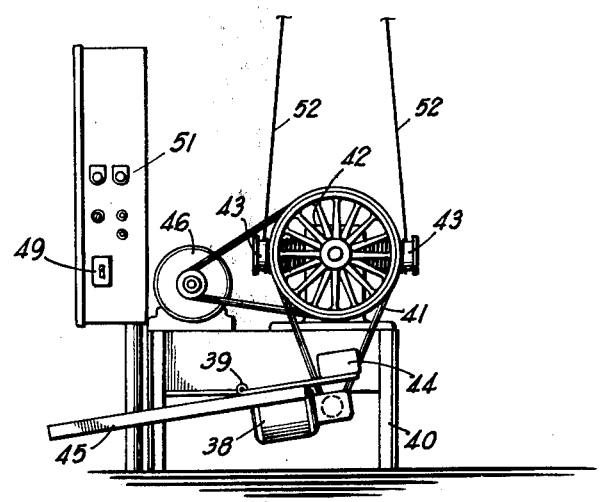
FIG. 2 is a side elevational view of the means of FIG. 1B taken at right angles to that Figure.

Referring to the drawings in detail, wherein an embodiment of the invention is shown, the numeral 10 designates a wire saw for cutting a stoneblock 11 suitably supported as at 12 beneath the bowed cutting portion 13 of a single strand convoluted cutting or sawing wire 14. It should be understood that conventional wire saws, such as the one depicted herein, may include a single cutting wire or multiple wires. For simplicity, a single wire machine is illustrated. Since the wire saw per se is conventional, it will not be described in great detail, but only sufficiently to enable the automatic feedback control forming the subject matter of the invention to be fully understood.

The wire saw 10 comprises a frame 15 having side uprights 16 on which a dolly or carriage 17 for the cutting wire 14 moves vertically in relation to the stationary stone 11. The dolly 17 has an upper cross frame member 18 connected with vertical legs 19 having guide rollers 20 on their lower ends in rolling contact with the two uprights 16. Similar guide rollers 21 are also provided on the upper ends of the dolly legs 19 in rolling contact with the uprights so that the dolly 17 may smoothly ride vertically on the frame 10.

Suitably journaled and supported on the dolly 17 are pulley wheels 22 for the support and guidance of the single strand stone sawing wire 14. This wire is driven in one direction to saw through the stone 11 by a motor 23 on the dolly member 18 and associated transmission gearing 24 coupled with the drive shaft 25 of the adjacent wire driving pulley 22.

Conduit means, not shown, deliver a slurry of water and silicon carbide onto the sawing wire to abrade the stone and enhance the cutting action of the wire.

Downward movement of the dolly 17 forces the lower stone cutting section 13 of the wire to assume a bowed condition against the stone 11 and to exert pressure on the stone for cutting it. The purpose of the invention is to automatically and constantly control the down feed of the dolly 17 to maintain a constant pressure of the wire portion 13 against the stone for the most efficient and economical cutting or sawing operation. As will presently be described, a sensing means on the dolly 17 constantly monitors the degree of bow in the wire section 13 and as this position of the wire tends to flatten out during cutting downwardly through the stone 11, this change in the bow of the wire is sensed and an electrical signal is fed back to an electronic means which can instantly initiate the downward movement of the dolly 17 and thus correct the bow of wire section 13 and its cutting pressure back to normal for the most efficient cutting.

Figure 5:
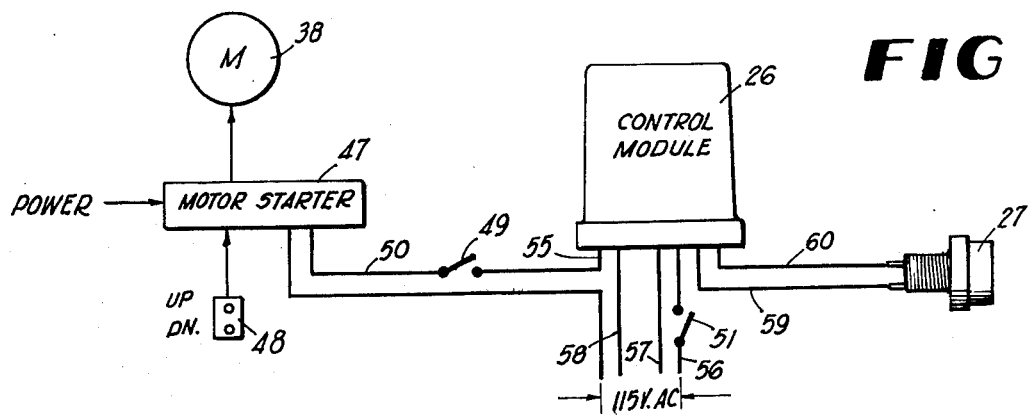
FIG. 5 is a schematic view of the automatic feedback control circuit employed in the invention.

The above is the essence of the invention and the means for controlling the degree of bow and the cutting pressure of the wire automatically with a direct feedback function from the wire itself comprises a radio frequency inductive (rf) proximity switch shown in FIG. 5 to include a control module 26 and a sensor 27. The electronically control module 26 creates a ratio frequency signal in the sensor 27 which projects a sensing field in front of its face. When metal in this field (the saw wire section 13) changes the sensor impedance, the load change in the module 26 activates the output circuit of the proximity switch, which in turn can start up the down feed drive motor means for the dolly 17 to be described. The particular proximity switch employed may be of a type described Series EE 940-EE 950, manufactured by Namco Controls, and Acme-Cleveland Company, 170 East 131st St., Cleveland, Ohio 44108.

Figure 3:
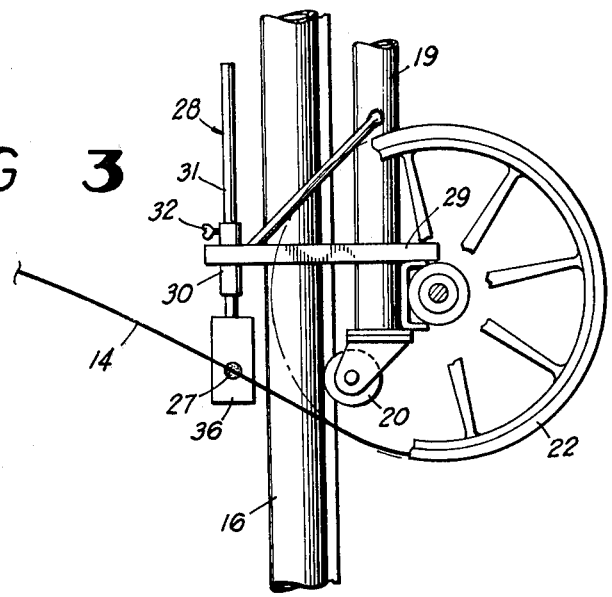
FIG. 3 is an enlarged fragmentary side elevational view of a proximity switch sensor and its adjustable mounting means on the wire dolly.
Figure 4:
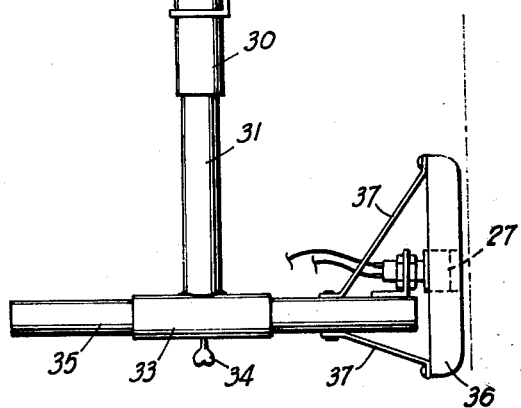
FIG. 4 is a further fragmentary elevational view of the sensor and adjustble mounting means taken at right angles to FIG. 3.

The proximity switch sensor 27 is mounted on one dolly leg 19, as best shown in FIGS. 3 and 4 of the drawings. A sensor support frame 28 consists of a horizontal angle bar 29 which is welded to the adjacent leg 19. Fixed to the distal end of the bar 29 is a vertical guide tube 30 which receives adjustably and telescopically a rod 31 whose position may be fixed by a clamping screw 32 in the tube 30.

At its lower end, the adjustable vertical rod 31 carries a horizontal guide sleeve 33 having a clamping screw 34 for a horizontally adjustable support bar 35 carrying the previously-noted sensor 27. The sensor is anchored in a polymer base 36 embraced by struts 37 which are secured to the bar 35. The described arrangement allows the sensor 27 to be adjusted both horizontally and vertically in relation to the bowed wire section 13 to be monitored.

The function of the sensor 27 is to chase or follow the bowed wire 13 as it cuts downward through the stone 11 and tends to flatten out. To follow the wire, the sensor and associated control module 26 must activate a down feed means for the carriage 17 on which the sensor is mounted. This means comprises a slow speed winch motor 38 mounted hingedly at 39 on a support stand 40 separate from the frame 15 and spaced from one side thereof. The motor 38, through suitable gearing 41, drives a gear head winch 42 having two drums 43 which are rotated in unison by the slow speed motor 38. The motor 38 is counterweighted at 44 to maintain an active drive for the winch through the gearing 41 and a foot pedal means 45 on the hingedly mounted motor 38 allows the slow speed drive to be de-activated at certain times so that a high speed drive motor 46 on the stand 40 may take over the drive of the gear head winch 42. The feedback control forming this invention operates in connection with the slow speed carriage drive motor 38 only and not with the motor 46, the motor 38 being shown in the schematic of FIG. 5, coupled with a conventional motor starter 47 having a carriage up and down manual control switch 48. An automatic-manual mode switch 49 is included in the conductor 50 linking the motor starter 47 and the proximity switch control module 26 and when the switch 49 is closed the automatic mode of operation of the feedback control is enabled. A system on-off switch 51 is provided in the AC power supply line to the starter 47 and proximity switch.

Two suspension cables 52 for the dolly 17 are wound on the winch drums 43 and are trained over guide pulleys 53 on the top of saw frame 15 and then attached to the top frame member 18 of the dolly 17 as at 54.

In the usual and preferred "chase" mode of operation, following initial adjustment of the sensor 27 horizontally and vertically on its support means to an elevation where the wire section 13 is below the sensor, the wire is caused to operate in the usual manner by main drive motor 23. The wire will gradually cut downwardly through the stone block 11 lessening the degree of bow in wire section 13 or causing it to flatten out. This resulting movement of the wire section 13 away from the sensing field being emitted from the front face of sensor 27 changes the sensor impedance, and the resulting load change in the module 26 of the proximity switch activates the output circuit of the switch which, through the motor starter 47, starts up the carriage down feed motor 38, slowly unwinding the two cables 52 from the winch drums 43 and slowly lowering the carriage 17 until the proper degree of bow and cutting pressure is reestablished in the wire section 13, also returning the wire section 13 into the effective field of sensor 27. The descent of carriage 17 moves sensor 27 downwardly chasing wire section 13, but never quite catching up to it. When the wire section 13 again tends to flatten out and leaves the effective sensing field of sensor 27, the described feed back control to carrige down feed motor 38 will again automatically lower carriage or dolly 17 and correct the bow and cutting pressure in wire section 13, while causing the wire section to reenter the effective sensing field. Each time that the sensor detects the wire's absence in its field, it lowers itself a further incremental distance by activation of the carriage down feed motor 38, as described, and the wire will again begin to drop away from the sensor 27 and move out of the sensing field and the process is repetitive.

It should be noted that in actual practice, the intermittent relative movements between the wire 13 and sensor 27 is infinitesimal since the sensor can be adjusted to detect 0.002 inch displacement of a metal element in its rf field. The distance of movement is so small that for practical purposes a constant cutting pressure and constant degree of bow can be maintained by the invention in the sawing wire section 13, automatically, and thus the objective of the invention is accomplished. The invention as may now be seen employs a closed loop system of feeding, and in a sense the saw, with the automatic feed-back control of the invention, can "talk back" so that the feed is speeded up or slowed down automatically as required for constant and efficient cutting.

An alternate "run away" mode of operation is also attainable through the described automatic feed-back control means by merely repositioning the terminal 55 of conductor 50 to another numbered terminal in the proximity switch control module 26. In the run away mode, compared to the above-described chase mode, the wire 13 is positioned manually above the sensor 27 rather than below it. The wire cuts down through the stone toward the sensor 27, and the sensor turns on the carriage down feed and in effect runs away from the wire. To establish the run away mode of operation, the saw must be manually fed down until the wire section 13 enters the active sensing field of sensor 27. At that time, the automatic feed is turned on and the sensor will control the feed in such a manner that the wire 13 will continue to be on the top edge of the sensing field of the sensor. This mode of operation has one advantage. Should the wire break, the sensor will not turn on the down feed and on a multiple strand saw this can be advantageous.

It should be mentioned that conductor 56 delivers AC power to module 26 as does conductor 57. Conductor 58 supplies controlled AC power and conductors 59 and 60, respectively, are outside and inside wires of the sensor cable.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a wire saw having a support frame, a dolly for supporting and guiding a stone cutting wire movably mounted on the support frame, motor winch means and associated suspension cable means for moving said dolly on said frame, an automatic feedback control comprising:

an *rf* inductive proximity switch electrically coupled to said motor winch means, said switch including a feedback sensor mounted on the dolly near a bowed section of the wire and responsive to changes in wire bow curvature during cutting for activating the motor winch means to move the dolly in a direction to correct wire bow curvature to an optimum degree for most efficient stone cutting.

2. The wire saw as defined in claim 1, wherein said proximity switch includes a control module electrically coupled to said feedback sensor; and including a start-up means for said motor winch means electrically coupled thereto and to said control module.

3. The wire saw as defined in claim 1, including support means for said feedback sensor on said dolly including means for adjusting the sensor in two planes relative to said cutting wire and dolly.

4. The wire saw as defined in claim 2, wherein said support means includes a member fixed to the dolly, a first substantially vertical sleeve secured to said member, a vertically adjustable bar within said first sleeve, a second substantially horizontal sleeve on the vertically adjustable bar, and a horizontally adjustable bar in the second sleeve and carrying said feedback sensor.

5. The wire saw as defined in claim 4, including clamping means on the first and second sleeves to releasably lock said vertically and horizontally adjustable bars in selected adjusted positions.

6. The wire saw as defined in claim 3, including an automatic-manual mode switch coupled between said start-up means and said control module.

7. A method for maintaining a substantially constant cutting pressure and bow curvature on the stone cutting wire of a wire saw having a support frame and a wire supporting and guiding dolly mounted for movement on the support frame relative to a stone being cut by the wire, there being motor winch means to control the movement of the dolly on said frame, said method comprising the steps of:

projecting an *rf* sensing field from a sensor on said dolly toward said bowed portion of said cutting wire;

sensing deviations in the bow curvature of the cutting wire during cutting from an optimum degree of bow curvature during cutting; and feeding back to the motor winch means a control signal for activating the motor winch means to move said dolly in a direction to return the cutting wire to the optimum degree of bow curvature necessary to maintain said constant cutting pressure for most efficient stone cutting.

* * * * *